United States Patent [19]

Meyer et al.

[11] Patent Number: 4,589,298
[45] Date of Patent: May 20, 1986

[54] ZERO BACKLASH DRIVE MECHANISM

[75] Inventors: Richard C. Meyer, La Habra; Wing S. Pang, West Covina, both of Calif.

[73] Assignee: Beckman Instruments, Inc., Fullerton, Calif.

[21] Appl. No.: 517,125

[22] Filed: Jul. 25, 1983

[51] Int. Cl.$^4$ .................................. F16H 55/18
[52] U.S. Cl. ............................. 74/441; 74/409
[58] Field of Search .............. 74/89.15, 409, 441, 74/424.8 R

[56] References Cited

U.S. PATENT DOCUMENTS

| | | | |
|---|---|---|---|
| 2,586,044 | 2/1952 | Horsky | 74/441 |
| 3,730,016 | 5/1973 | Miller | 74/424.8 B |
| 3,964,001 | 6/1976 | Clark | 74/409 X |
| 4,072,064 | 2/1978 | Lloyd et al. | 74/409 |
| 4,155,269 | 5/1979 | Lee et al. | 74/424.8 A |
| 4,210,033 | 7/1980 | Erikson et al. | 74/441 X |
| 4,279,173 | 7/1981 | Krebs et al. | 74/441 |

FOREIGN PATENT DOCUMENTS 2330497 6/1977 France .
110851 7/1982 Japan ................................ 74/441

OTHER PUBLICATIONS

IBM Technical Disclosure Bulletin, vol. 8, No. 7, Dec. 1965, pp. 1003, 1004.

Primary Examiner—Stephen F. Husar
Attorney, Agent, or Firm—W. H. May; A. Grant; G. T. Hampson

[57] ABSTRACT

A zero backlash device. The device includes a spring loaded bracket for providing a lateral force to the driving nut on a threaded rod. This lateral force is directed perpendicularly to the axis of the threaded shaft thus insuring continued intimate contact between the threads on the driving nut and the threads on the shaft.

6 Claims, 6 Drawing Figures

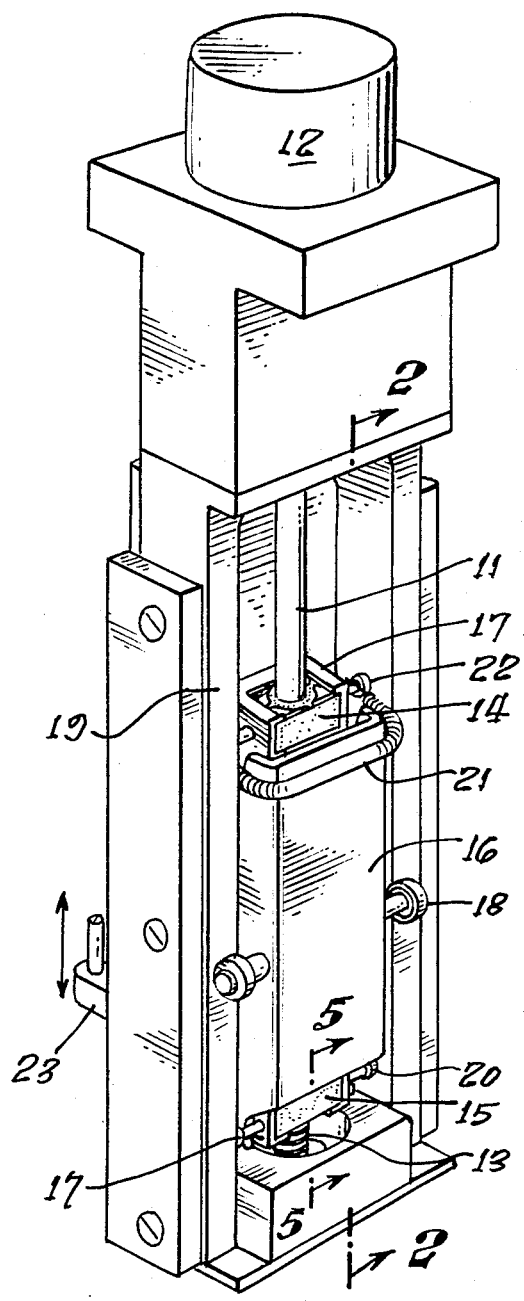
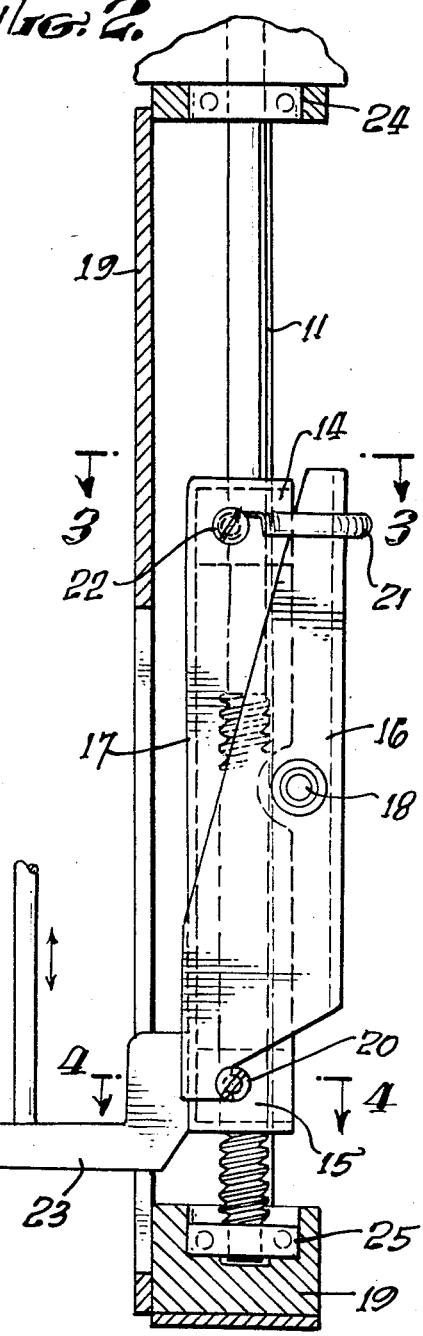

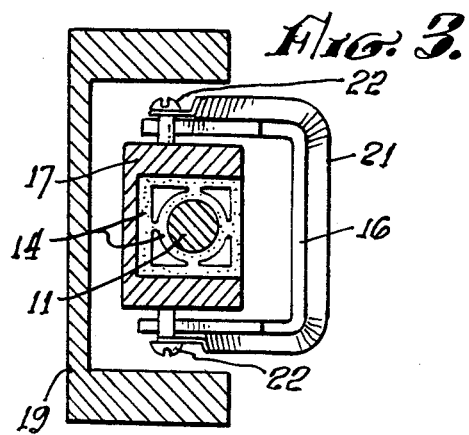
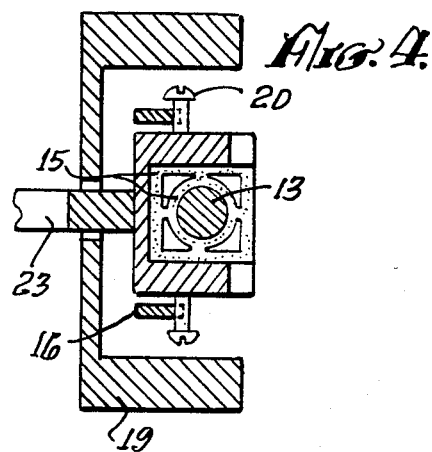
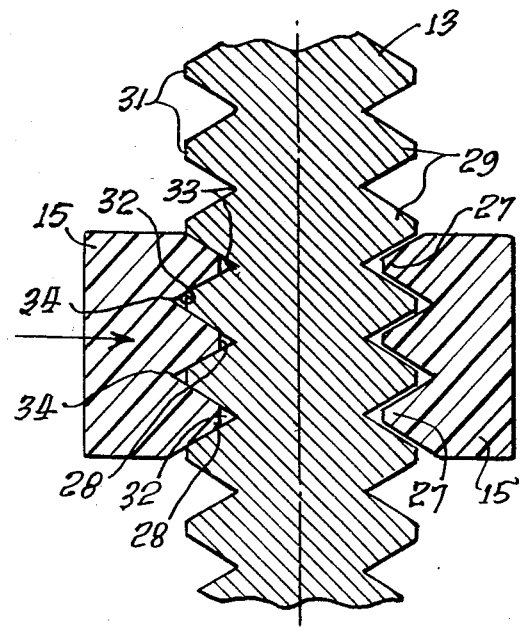
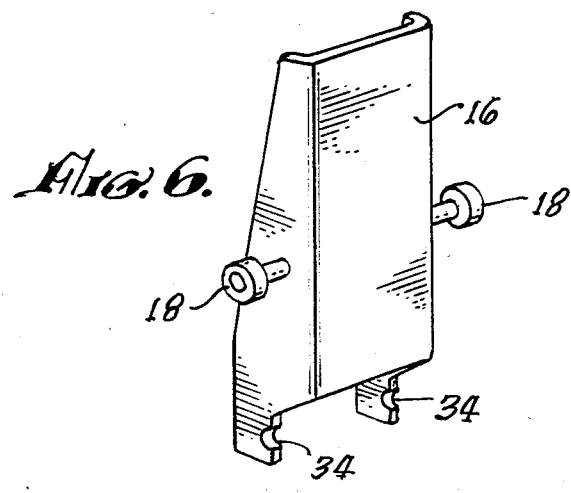

ZERO BACKLASH DRIVE MECHANISM

BACKGROUND OF THE INVENTION

1. Field of the Invention

The invention is related to the field of gearing. More particularly, the invention is related to the field of sectional rotary bodies. In still greater particularity, the invention is a backlash take-up device. By way of further characterization, but not by way of limitation thereto, the invention is a device for applying a lateral force to a driving nut in order to maintain intimate contact between the threads of the driving nut and the threads of a rotating shaft.

2. Description of the Prior Art

Backlash, a common problem with any ordinary drive mechanism, is mainly due to dimensional clearance between mating components. The performance and accuracy of a drive mechanism is related to, and limited by, the amount of backlash within the mechanism. It is not only impractical, but also prohibitively costly, to perfectly match every component within every drive mechanism to achieve zero backlash. There are numerous anti-backlash drive mechanism designs in existence today. Many of these devices load the drive nuts which are threaded onto the lead screw in order to maintain thread contact between the drive nuts and lead screws. This loading is done in an axial direction. For example, one such device disclosed in U.S. Pat. No. 4,279,173 issued to F. G. Krebs et al. on July 21, 1981 discloses such a device. That is, Krebs employs a spring loaded split nut to accomplish zero backlash. The preloading force is supplied by a spring and is applied vertically to the nuts such that force is exerted in opposite directions on the lead screw. The rotation of the lead screw tends to wind and unwind the spring loading apparatus. In clinical laboratory instruments such as diluters on dispensers, precise amounts of liquids must be dispensed. That is, in a clinical assay the volume ratios are critical to the accuracy of the test being performed. Thus, precise movement of the driving mechanism is required in order to displace these precise volumes. While the above described types of anti-backlash mechanisms are suited for their intended purposes, they tend to be costly and complicated. These devices require a separate guide rod and anti-rotation devices.

SUMMARY OF THE INVENTION

The invention is a zero backlash driving apparatus which includes a shaft having a threaded portion thereon. A means for rotating the shaft is connected thereto. A driving member is threadably engaged with the drive portion of the shaft. There is a means associated with the driving member for loading the driving member with a force which is directed toward the shaft and perpendicular to the axis of the shaft.

In the preferred embodiment, the driving member is a nut threaded onto the threaded portion of the shaft. A guide block is slidably engaged with the guide portion of the shaft. A force bracket is connected to the driving nut and includes a means for urging the bracket away from the lead screw. A spring is attached to the guide block and contacts over the opposite end of the force bracket to urge the force bracket toward the shaft in the area of the guide block. The force bracket is thus pivoted around the urging means such that a force is exerted by the urging means or the driving nut to load the nut with a force directed toward the shaft. This results in the threads of the driving nut being held in intimate contact with the threads on the shaft.

BRIEF DISCUSSION OF THE DRAWINGS

FIG. 1 is a perspective view of the apparatus;

FIG. 2 is a side sectional view taken along line 2—2 in FIG. 1;

FIG. 3 is a sectional view taken along line 3—3 in FIG. 2;

FIG. 4 is a sectional view taken along line 4—4 in FIG. 2;

FIG. 5 is a sectional view taken along line 5—5 in FIG. 1; and

FIG. 6 is a perspective view of the force bracket.

DESCRIPTION OF THE PREFERRED EMBODIMENT

Referring to FIG. 1, the apparatus includes a shaft 11 connected to a rotating means which may include a stepper motor 12. Shaft 11 includes a threaded portion 13. A guide block 14 is slidably engaged with shaft 11. A drive nut 15 is threadably engaged with the threaded portion 13 of shaft 11. A force bracket 16 is pivotally attached to a frame member 17 at point 20. Frame member 17 is attached to guide block 14 and driving nut 15. A pair of rollers 18 are connected to force bracket 16. Rollers 18 are free to roll along the front surface of a housing 19. A resiliently biasing means, which may include a spring 21 is attached to frame 17 at attachment point 22. A drive bracket 23 is connected to driving nut 15.

Referring to FIG. 2, shaft 11 is held in housing 19 at upper bearing 24 and lower bearing 25. Upper bearing 24 is axially pre-loaded to eliminate any axial clearance between shaft 11, lower bearing 25 and housing 19. Guide block 14 is slidable up and down on shaft 11. Force bracket 16 is pivotally connected to driving nut 15 at points 20. Roller 18 provides a low friction rolling motion between shaft 11 and drive nut 15 as well as providing a counter force between force bracket 16 and housing 19 as discussed below. Drive bracket 23 is connected to drive nut 15. Drive nut 15 is connected to guide block 14 by a frame member 17. Spring 21 is connected to guide block 14 at attaching points 22.

Referring to FIG. 3, a sectional view along line 3—3 in FIG. 2 illustrates the engagement of guide block 14 with shaft 11. Guide block 14 is preferably made of a low friction material such as Teflon and is free to move up and down shaft 11. Guide block 14 connects to frame 17 which is also connected to driving nut 15 in FIG. 2. Spring 21 is connected to frame member 26 at anchor points 22. Spring 21 extends around the upper portion of force bracket 16.

Referring to FIG. 4, a sectional view through line 4—4 in FIG. 2 illustrates the arrangement of driving nut 15 and shaft 11. Driving nut 15 is threadably engaged with threaded portion 13. Driving nut 15 is connected to frame member 17 which is itself connected to drive bracket 23. Force bracket 16 is pivotally connected to frame member 17 at anchor points 20.

Referring to FIG. 5, a sectional view taken through line 5—5 in FIG. 1 is shown. Threaded portion 13 of shaft 11 is engaged with drive nut 15. Drive nut 15 is preferably made of Teflon or other low friction material. Teeth 27 on drive nut 15 include a flattened crest portion 28. Teeth 29 on threaded portion 13 also include a flat crest portion 31. A space 32 exists between flattened crest portion 28 and the root portion 33 of threads 29 as well as between crest portion 31 and the nut portion 34 of threads 27.

Referring to FIG. 6, a perspective view of force bracket 16 is shown illustrating rollers 18 and pivot points 34 which engage with anchor point 20 on frame member 17 as shown in FIG. 4.

MODE OF OPERATION

Referring to FIG. 1, it is desired to move drive bracket 23 up and down in order to precisely move a plunger in a syringe or other device in order to dispense fluids in an analytical instrument. As disclosed previously, it is extremely important that precise amounts of fluid are dispensed and thus zero backlash is required in the drive mechanism to accurately dispense the liquid from the syringe. Stepper motor 12 rotates shaft 11 in order that the drive nut 15 is moved up and down on the threaded portion 13 of shaft 11. Because drive bracket 23 is attached to drive nut 15 it is also moved up and down in this manner. Drive bracket 23 is connected to the syringe.

In order to provide zero backlash, it is necessary to insure intimate contact between the threads of drive nut 15 and the threads of threaded portion 13 on shaft 11. Referring to FIG. 2, a force is exerted on drive nut 15 by force bracket 16. That is, viewing the device in FIG. 2, a force is exerted by force bracket 16 to the right on drive nut 15. This is accomplished by employing spring 21 at the top portion of force bracket 16. Spring 21 is attached to frame 17 and spring 21 fits over the upper portion of force bracket 16. The upper portion of force bracket 16 urges guide block 14 toward shaft 11 by the tension in spring 21 in combination with the force exerted by rollers 18 away from shaft 11. Thus backlash associated with clearances between guide block 14 and shaft 11 is eliminated. Prior art devices employing separate guide rods require separate anti-backlash mechanisms.

As can be seen from FIGS. 1 and 2, rollers 18 may move up and down housing 19. These rollers provide a pivot point upon which the force of spring 21 to the left in FIG. 2 will thus exert an opposite force to the right against drive nut 15. The effect of this force is to keep the threads of drive nut 15 in intimate contact with the threads 29 on threaded portion 13 of shaft 11. As can be more clearly seen in FIG. 5, the force to the right against drive nut 15 allows the threads 27 of drive nut 15 to be held tightly against threads 29 on shaft 11. The magnitude of the forces depend upon the distances between the contact points and the tension in spring 21. These parameters are based upon engineering design parameters depending upon the type of material used and are not essential to this disclosure.

Wear may occur between the contacting portions of threads 28 on driving nut 15 and threads 29 on shaft 11. This wear is dependent upon the amount of usage and the materials chosen for the threads. FIG. 5 illustrates how zero backlash is maintained despite the wear encountered. Crest portions 28 on threads 27 of drive nut 15 and crest portions 31 on threads 29 on drive shaft 11 are flat. Thus, there is a clearance space 32 between the crest portions and root portions of the threads as they threadably engage. Because a force is always exerted to the right in FIG. 5 against drive nut 15 there is no clearance between the contacting portions until the clearance area 32 is zero. At this point the flat crest 28 becomes essentially pointed and contacts root portion 33 in the threads 29 of shaft 11. This condition will normally exceed the useful life of the device. The invention will still bias the nut against the shaft but the flat crests ensure more positive contact.

Because a drive block and drive nut are used on one shaft the device eliminates the alignment problem which is associated with separate lead screw, shaft and guide rod device previously employed. That is, in these previous devices rotational and lateral movement was prevented by a second shaft which was needed to stabilize the carriage as it traveled up and down a threaded portion of the shaft. Such is the case with all devices employing split nuts and the like as was discussed in the description of the prior art herein. In the present case, because the loading on the drive nut need only take place at one point, the upper guide block may be used as a guide and slidably engaged with the shaft. Backlash associated with the guide block is also eliminated as discussed above. In addition, the eccentricity problem associated with long circular shafts is also diminished and compensated for because of tension spring 21 which maintains a constant tension against the shaft. The use of the rolling ball bearings 18 on force bracket 16 to provide the pivot point for the force results in a much lower frictional force between shaft 11 and housing 19 than in previous systems.

While the invention has been disclosed with respect to a preferred embodiment thereof, it is not to be so limited as changes and modifications may be made which are within the full intended scope of the claims. For example, while spring 21 has been disclosed as a single spring connected to guide block 14, and wrapped around force bracket 16, it is possible that separate springs may be used which are connected to guide block 14 and force bracket 16. The preferred embodiment allows for easy disassembly, however. In addition, while Teflon has been disclosed as the preferred material for guide block 14 and drive nut 15, any suitable material may be used. While nut 15 is contemplated as being internally threaded it is possible that only the portion of nut 15 which contacts threaded portion 13 in FIG. 5 may be threaded. Also, while flat crests have been disclosed to ensure spaces 32, it is possible that a differently pitched thread could be used such that a gap would occur between the crest of one thread and the root of the opposing thread. In addition, while a stepper motor has been disclosed as the rotating means, any type of rotating driving means may be employed advantageously with the device. The thrust of the invention is the exertion of a lateral force on the driving nut in order to compensate for the backlash clearances. This is as opposed to axially directed forces in prior art devices.

A novel and unobvious device has been disclosed herein. The description contained herein allows one skilled in the art to make and use this device.

What is claimed is:

1. A zero backlash driving apparatus comprising:
   a shaft including a threaded portion and a smooth portion;
   means, connected to said shaft, for rotating said shaft;
   a driving member threadably engaged with said threaded portion;
   a guide member slidably engaged with said smooth portion;
   a force bracket including a first end adjacent said guide member and a second end ajacent said driving member;

means for providing a pivot point on said force bracket intermediate said first and second ends;

means movably supporting said pivot point for providing a force away from said shaft countering the force of said pivot point toward said shaft;

means for resiliently biasing said first end toward said guide member; and means for transferring force from said second end to said driving member.

2. An apparatus as in claim 1 wherein said resiliently biasing means includes a spring attached to said guide member.

3. An apparatus as in claim 2 wherein said spring is wrapped around said first end of said force bracket.

4. A zero backlash driving apparatus comprising:

a shaft including a threaded portion and a smooth portion;

means, connected to said shaft, for rotating said shaft;

a driving member threadably engaged with said threaded portion;

a guide member slidably engaged with said smooth portion;

a force bracket including a first end adjacent said guide member and a second end adjacent said driving member;

a housing within which said shaft is rotatably retained, said housing including a surface parallel to said shaft;

means for pivoting said force bracket about said surface intermediate said first and second ends;

means for resiliently biasing said first end toward said guide member; and means for transferring force from said second end to said driving member.

5. An apparatus as in claim 4 wherein said means for pivoting includes a roller fixed to said force bracket, said roller adapted to travel along said surface.

6. A zero backlash driving apparatus comprising:

a shaft including a threaded portion and a smooth portion;

means, connected to said shaft, for rotating said shaft;

a driving member threadably engaged with said threaded portion;

a guide member slidably engaged with said smooth portion;

a force bracket including a first end adjacent said guide member and a second end adjacent said driving member;

a housing within which said shaft is rotatably retained, said housing including two coplanar surfaces parallel to said shaft;

two rollers fixed to said force bracket, each of said rollers adapted to travel along a respective one of the said two surfaces to provide a pivot point for said force bracket;

a spring connected between said guide member and said first end for biasing said first end toward said guide member; and means for transferring force from said second end to said driving member.

* * * * *